United States Patent
Nohara et al.

(10) Patent No.: US 8,988,230 B2
(45) Date of Patent: Mar. 24, 2015

(54) DEVICE AND METHOD FOR SMART, NON-HABITUATING, AUTOMATIC BIRD DETERRENT SYSTEM

(75) Inventors: Timothy J. Nohara, Fenwick (CA); Andrew M. Ukrainec, Etobicoke (CA); Graeme S. Jones, Waterloo (CA); Robert C. Beason, Huron, OH (US); Peter T. Weber, Dundas (CA); Domingos Nelson Costa, Grimsby (CA); Carl Krasnor, St. Catharines (CA)

(73) Assignee: Accipiter Radar Technologies Inc., Ontario (CA)

( * ) Notice: Subject to any disclaimer, the term of this patent is extended or adjusted under 35 U.S.C. 154(b) by 552 days.

(21) Appl. No.: 13/281,117

(22) Filed: Oct. 25, 2011

(65) Prior Publication Data

US 2013/0098309 A1    Apr. 25, 2013

(51) Int. Cl.
| | |
|---|---|
| G08B 23/00 | (2006.01) |
| A01K 29/00 | (2006.01) |
| A01M 29/06 | (2011.01) |
| A01M 29/10 | (2011.01) |
| A01M 29/16 | (2011.01) |
| A01M 31/00 | (2006.01) |

(52) U.S. Cl.
CPC ............. *A01M 29/06* (2013.01); *A01M 29/10* (2013.01); *A01M 29/16* (2013.01); *A01M 31/002* (2013.01)
USPC ................ 340/573.2; 340/384.2; 340/539.13; 340/539.19; 119/713

(58) Field of Classification Search
USPC ................... 340/573.2, 384.1, 384.2, 539.13, 340/539.19, 384.3; 342/41, 58, 59, 179; 119/713, 719; 701/1, 2
See application file for complete search history.

(56) References Cited

U.S. PATENT DOCUMENTS

| | | | |
|---|---|---|---|
| 2,444,770 | A | 7/1948 | Fyler |
| 2,444,771 | A | 7/1948 | Fyler |
| 2,497,913 | A | 2/1950 | Rines |
| 2,519,397 | A | 8/1950 | Ranger |
| 2,597,348 | A | 5/1952 | Longacre et al. |

(Continued)

FOREIGN PATENT DOCUMENTS

| | | |
|---|---|---|
| EP | 0033059 A2 | 8/1981 |
| GB | 2176073 A | 12/1986 |

(Continued)

OTHER PUBLICATIONS

"Norcontrol IT Wins Major U.S. Contract"; KNC News Archive; Jun. 13, 2001.

(Continued)

*Primary Examiner* — Hung T Nguyen
(74) *Attorney, Agent, or Firm* — R. Neil Sudol; Henry D. Coleman (57) ABSTRACT

A bird deterrent system includes (i) measurement of bird habituation to activation of deterrent devices and (ii) reduction of habituation through increased selectivity in activating deterrents only for birds posing a threat to or threatened by a protected area, and in particular, those within threat altitudes. The bird deterrent system further provides (iii) analytical data in support of safety management systems, risk management, etc., and (iv) integrated, wide-area radar coverage with multiple virtual intrusion zones providing multiple lines of defense around and over very large protected areas.

62 Claims, 5 Drawing Sheets

(56) References Cited

U.S. PATENT DOCUMENTS

| | | |
|---|---|---|
| 2,624,874 A | 1/1953 | Rines |
| 2,822,537 A | 2/1958 | Bartelink |
| 2,946,996 A | 7/1960 | Wassell |
| 3,070,795 A | 12/1962 | Chambers |
| 3,072,903 A | 1/1963 | Meyer |
| 3,214,755 A | 10/1965 | Blass et al. |
| 3,267,270 A | 8/1966 | Smidowicz |
| 3,267,271 A | 8/1966 | Kindle |
| 3,448,450 A | 6/1969 | Alfandari et al. |
| 3,697,990 A | 10/1972 | Emch |
| 3,778,827 A | 12/1973 | Strenglein |
| 3,971,020 A | 7/1976 | Howard |
| 4,150,378 A | 4/1979 | Barton |
| 5,254,999 A | 10/1993 | Lee |
| 5,278,564 A | 1/1994 | Groenenboom |
| 3,274,593 A | 9/1996 | Varela et al. |
| 5,663,720 A | 9/1997 | Weissman |
| 5,848,378 A | 12/1998 | Shelton et al. |
| 5,923,285 A | 7/1999 | Andrusiak et al. |
| 5,971,580 A | 10/1999 | Hall et al. |
| 6,211,814 B1 | 4/2001 | Benjamin et al. |
| 6,249,241 B1 | 6/2001 | Jordan et al. |
| 6,285,630 B1 * | 9/2001 | Jan ................ 367/139 |
| 6,653,971 B1 * | 11/2003 | Guice et al. ........ 342/54 |
| 6,832,156 B2 | 12/2004 | Farmer |
| 6,906,659 B1 * | 6/2005 | Ramstack ........ 342/54 |
| 6,985,837 B2 | 1/2006 | Moon et al. |
| 7,016,772 B2 | 3/2006 | Yanagi |
| 7,173,534 B1 * | 2/2007 | Markham et al. ....... 340/573.2 |
| 7,864,103 B2 | 1/2011 | Weber et al. |
| 7,940,206 B2 | 5/2011 | Nohara et al. |
| 2003/0025629 A1 | 2/2003 | Barrock et al. |
| 2003/0028293 A1 | 2/2003 | Jankowiak et al. |
| 2008/0266171 A1 * | 10/2008 | Weber et al. ........ 342/123 |

FOREIGN PATENT DOCUMENTS

| | | | |
|---|---|---|---|
| JP | 02290990 | 12/1990 | |
| JP | 63-215983 | 9/1998 | |
| WO | 2009010961 | * 1/2009 | ........ 340/573.2 |
| WO | WO2009/010961 A2 | 1/2009 | |

OTHER PUBLICATIONS

"Litton Marine Systems Introduces New-Generation Vessel Traffice System (VTS)"; Soerry Marine News & Press Releases; Jul. 28, 2000; pp. 1-5.

"Lotton Marine Systems Suppiles VTS for River Locks in Holland"; Sperry Marine News & Press Releases; Aug. 18, 2000; pp. 1-5.

Vessel Traffic Management & Information System VTMIS5060; NOR Control IT AS; 2004; pp. 1-2.

"Low-Cost Radar Surveillance of Inland Waterways for Homeland Security Applications"; Peter Weber, et al.; Apr. 26-29, 2004; pp. 1-6.

"Affordable Avian Radar Surveillance Systems for Natural Resource Management and BASH Applications"; Tim Nohara, et a;. 2005, pp. 1-6.

"Maritime Safety, Security, & Surveillance." Lockheed Martin Brochure. Jan. 2003. 8 pages.

"Affordable, Real-Time 3-D Avian Radar Networks for Centralized North American Bird Advisory Systems"; Peter Weber, et al. Aug. 2005, pp. 1-8.

"Vessell Traffic Management & Information Systems Applications". Norcontrol IT AS. Aug. 2000.

"Sicom Develops Security Radar Technology." Canadian Electronics. Nov./Dec. 2003. vol. 18, No. 7.

"IMM Algorithm for tracking targets that maneuver through coordinated turns." Proceedings of the Society of Photo-Optical Instrumentation Engineers. vol. 1698. Apr. 20-22, 1992.

"The Jindakee Operational Radar Network: Its Architectire and Surveillance Capability." IEEE 1995 Conf. May 8-11, 1995. pp. 592-697. Cameron Alex.

"Development of a Virtual Radar Environment." International GeoScience and Remote sensing Symposium. vol. 6. Jul. 9-13, 2001. pp. 2599-2601. Chandraesekar et al.

"The Haida's Last Mission." The Standard (St. Catharines-Niagra) Aug. 27, 2003, pp. A1-A2. Currie, Bill.

"HMCS Haida voyage to resting berth Hamilton, Ontario . . . tracked using newest homeland security radar technology . . . " Fonthill, Ontario. Sicom Systems Ltd. Press Rel. Aug. 2005.

* cited by examiner

DEVICE AND METHOD FOR SMART, NON-HABITUATING, AUTOMATIC BIRD DETERRENT SYSTEM

FIELD OF THE INVENTION

This invention relates to deterrent systems and methods to keep birds away from protected areas that are either threatened by birds or pose a threat to birds. The invention is particularly useful for protecting birds from harmful effects of ponds generated during oil and mining processes, for protecting birds from power generation and transmission structures such as wind farms, for prevention of bird-aircraft strikes at airports to enhance aviation safety, and for protecting crops from birds to enhance yield.

BACKGROUND OF THE INVENTION

Several applications require keeping birds away from protected areas, which we define herein as geographical areas that either threaten birds and/or are threatened by birds. Consider for example, mining and oil operations with associated tailings ponds that may be harmful to birds. Operators and regulators desire economical devices and methods designed to help keep birds from landing on these protected areas, i.e. the tailings ponds.

Electrical power generation structures such as wind turbines pose hazards to birds because birds flying through wind farms, especially during low visibility, can come in contact with turbine blades, which rotate within a confined altitude band up to a couple of hundred meters above the ground. In this example, the wind farm can be treated as a protected area. To protect birds flying at low altitudes, operators and regulators desire economical devices and methods that will cause birds to alter their flight paths when approaching protected areas so as to avoid collision with wind turbines.

Birds are a significant hazard to aviation safety. Billions of dollars in damage to aircraft and significant loss of life have been recorded as the result of birds colliding with aircraft (referred to as bird-aircraft strikes, or simply bird strikes), particularly while aircraft are on approach or departure in the vicinity of airports. Birds do not survive bird strikes. Several protected areas can be defined around an airport where bird-aircraft strike hazards (BASH) are known to be significant. Airport operators and their regulators desire economical devices and methods designed to cause birds to safely alter their flight path when approaching these protected areas so as to avoid collisions with aircraft. The airport environment requires particular care since we do not want to deter birds from entering one protected area only to steer them into another area of potentially greater hazard.

Farmers know all too well the damage that birds can do to their crops. They have employed all sorts of bird deterrent devices such as cannons and effigies to harass birds in an attempt to keep them away. If one treats precious crop areas as protected areas, farmers desire economical devices and methods to keep birds away from these protected areas in order to increase the quantity and quality of their crop yields.

In the above applications, several types of bird deterrents and bird harassment methods have been employed, some of which are automated and run unattended, and some of which are used by trained personnel. Automated deterrents such as propane cannons, effigies, acoustic devices that broadcast aversive auditory emissions such as alarm, distress, and predator vocalizations, and lasers operated in low-light have been used with some success but suffer from habituation—i.e., the birds get used to them and the deterrents eventually lose their effectiveness in harassing and deterring birds. Modern deterrents usually activate randomly in an attempt to increase the time duration before birds become habituated to them. Human-operated deterrents such as hand-held pyrotechnics and hand-held lasers are more effective because they are selectively used only against birds approaching or found within protected areas. As a result, habituation occurs slowly or not at all. These human-operated deterrents, however, are impractical to use in a continuous fashion over large protected areas or at night.

While radar-activated deterrent systems have been reported in use in rare cases, their effectiveness has not been quantified and reported. The systems were deployed to protect a tailings pond with an attempt to reduce habituation by activating deterrents only when birds were detected by the radar. In these limited cases, 2D radars were employed that did not provide bird altitude selectivity over the protected area. Also, the protected area was small, concentrated over water, and monitored from a single radar location.

OBJECTS OF THE INVENTION

A primary object of the current invention is to provide improved bird-deterrent systems for keeping birds away from protected areas.

It is a more particular object of the present invention to provide improved bird-deterrent systems that have enhanced intelligence and more automated capabilities relative to conventional systems.

A further object of the present invention is to provide such bird-deterrent systems with enhanced flexibility and reliability.

With respect to flexibility, it is an object of the present invention to support all kinds of deterrent devices, including portable devices on platforms floating on water, and fixed and portable devices deployed on land.

Also with respect to flexibility, it is an object of the present invention to enable integration or use of all kinds of surveillance sensors, including 3D and 2D avian radars, infrared and camera sensors, weather radars, and national radar networks such as NEXRAD.

Another particular object of the present invention is to provide improved bird-deterrent systems that reduce the impact of avian habituation on system effectiveness over time.

A related object of the present invention is to provide such bird-deterrent systems that reduce the impact of environmental change on the system effectiveness over time.

These and other objects of the invention will be apparent from the drawings and descriptions included herein. It is to be noted that each object of the invention is achieved by at least one embodiment of the invention. However, it is not necessarily the case that every embodiment of the invention meets every object of the invention as discussed herein.

SUMMARY OF THE INVENTION

The present invention concerns practical improvements over state-of-the-art 2D radar-activated bird deterrent systems to make them smart, far more effective, flexible, and affordable.

The present invention provides smart and affordable, automated bird-deterrent systems that keep birds away from protected areas, that are capable of measuring effectiveness and habituation and are capable of altering system configuration in order to maintain high performance.

The present invention provides software-configured control to alter system configuration in response to measured reductions in performance resulting either from habituation by the birds or from changes in the environment. More specifically, the present invention provides in part means such as an expert system or cognition to automatically alter system configuration in response to measured reductions in performance resulting from either avian habituation or changes in the environment.

The present invention provides the means to measure the 3D trajectories (latitude, longitude, altitude, speed and heading versus time) of birds to enable or inform the selective activation of deterrents, for instance, against only those birds that are a threat to or are threatened by a particular protected area, thereby reducing or eliminating habituation.

A feature of the present invention is an information subsystem that permanently and continuously stores and organizes system data, including 3D bird trajectories, threat alerts, and deterrent activation information, and analyzes system effectiveness in a manner suitable for investigations into bird mortalities, litigation, due diligence concerning risk management, safety management systems, detection of habituation, scientific analyses, and training.

The present invention provides for automatically and flexibly integrating a number of non co-located or mutually spaced surveillance sensors to collectively form a large coverage volume within which multiple virtual sub-volumes (also referred to as lines of defense or intrusion zones) can be established, which, when penetrated by birds that are a threat to or threatened by a protected area, will trigger a threat alert that causes particular sets of deterrent devices to activate in response.

The present invention contemplates the automatic locating of deterrent devices and the maintenance thereof independently of the surveillance sensors. The deterrent devices can be moved and programmed in virtual sets that activate in response to particular threat alerts. The present invention supports all kinds of deterrent devices, including portable devices on platforms floating on water, and fixed and portable devices deployed on land.

The present invention integrates all kinds of surveillance sensors, including 3D and 2D avian radars, infrared and camera sensors, weather radars, and national radar networks such as NEXRAD, in order to provide surveillance coverage volume.

In summary form, the improvements of the present invention include the following features:

Quantification of avian habituation to activation of deterrent devices

Feedback by altering system configuration to reduce habituation

Reduction of habituation through increased selectivity in activating deterrents only for birds posing a threat to or threatened by a protected area, and in particular, those within threat altitudes Provision of analytical data in support of safety management systems, risk management, due diligence, investigations, litigation, scientific analyses, training, and public policy Flexible and affordable, integrated, wide-area coverage with multiple virtual intrusion zones providing multiple lines of defense around and over very large protected areas Flexible, virtual interface between surveillance subsystem and deterrent subsystem, allowing one to be relocated relatively independently of the other, which is essential when protected areas change frequently Support for any type of surveillance sensor that can detect birds posing a threat to or threatened by a protected area In accordance with the present invention, the following general automated bird deterrent system elements work together to provide (to varying degrees) the desired features listed above:

1. A protected area from which the system is intended to keep birds away.
2. A deterrent subsystem consisting, in the general case, of several deterrent apparatuses (or simply deterrents) arranged within the protected area as well as around and away from the protected area.
3. A surveillance subsystem with a coverage volume that typically includes the protected area as well as volumes around and away from the protected area. The surveillance subsystem tracks birds in the coverage volume, and detects when they pose a threat to or are threatened by a protected area, causing a threat alert to be issued for each instance of a detected threat.
4. A deterrent activation processor that receives threat alerts from the surveillance subsystem and, based on the information contained therein, selects and activates appropriate deterrents to harass the birds in question in an attempt to cause them to change their course and depart away from the protected area.
5. An information subsystem that collects sufficient information on bird trajectories (or tracks), threat alerts, and deterrent activations to enable: (i) measurement of system effectiveness and avian habituation; (ii) alteration of system configuration to reduce habituation; (iii) interface with system operators; and (iv) support of a variety of data analytics.
6. One or more operator situational awareness displays via a mobile computing device or a computer in an operations centre running common operating picture (COP) software that presents in real-time bird tracks within the coverage volume, indications of threat alerts, and indications reflecting the status of deterrents. Operators are able to follow birds' responses to the surveillance-activated deterrents.

A real-time, automated, bird deterrent system comprises, in accordance with the present invention:

a surveillance subsystem consisting of one or more surveillance sensor apparatuses adapted for detecting birds posing a threat to or threatened by a protected area;

a deterrent subsystem consisting of one or more deterrent apparatuses adapted for harassing detected birds in response to associated threats;

a deterrent activation processor that receives a threat alert from the surveillance subsystem when intruding birds are detected that pose a threat to or are threatened by the protected area, the deterrent activation processor determining and activating a subset of the deterrent apparatuses in response to each threat alert; and an information subsystem comprising a data storage device that stores the identification, date and time associated with each threat alert, the identification of the respective deterrent apparatuses that were activated in response to a given threat alert, and the respective trajectories of the detected birds provided by the surveillance subsystem to enable determination of whether the detected birds left the protected area in response to the activation of the respective deterrent apparatuses.

A related method in accordance with the present invention comprises:

operating a surveillance subsystem with one or more surveillance sensor apparatuses to substantially continuously monitor a surveillance volume to detect birds posing a threat to or threatened by a protected area and generating and sending a threat alert to a deterrent activation processor when such birds are detected, the operating of the surveillance subsystem further including tracking and generating trajectories for each bird;

operating a deterrent activation processor by receiving the threat alerts and selecting and activating one or more deterrent apparatuses included in the deterrent subsystem in response to the threat alerts;

operating a deterrent subsystem with one or more deterrent apparatuses by activating those deterrent apparatuses selected by the deterrent activation processor in response to threat alerts received from the surveillance subsystem; and operating an information subsystem by storing sufficient bird deterrent system information to enable determination of whether the detected birds left or avoided the protected area in response to activation of the respective deterrent apparatuses.

Preferably, the information subsystem continuously organizes and stores indefinitely all narrowband target data, threat alert data, and deterrent subsystem activation data. These data allow system effectiveness and avian habituation to be measured so that system configuration can be altered and performance maintained by reducing or obviating the habituation that would otherwise occur. The data also provide support for a rich situational awareness picture to operators, allowing them to react with deployment of response personnel and other resources to reduce threats. In addition, these data support a variety of data analytics suitable for safety management systems, risk management, due diligence, investigations, litigation, scientific analyses, training, and public policy.

One embodiment of deriving measures of effectiveness and habituation includes computing one or more metrics from the following set: i. total number of bird intrusions successfully deterred per hour, day, week, month, season, or year; —and ii. percentage of bird intrusions successfully deterred per hour, day, week, month, season, or year and comparing the result to previously recorded values.

A significant increase in measured habituation will prompt an alteration of system configuration based on a set of system configuration parameter sets designed for this purpose. The smart deterrent system is preferably software configurable, allowing the simple loading of a new configuration parameter set to alter the system configuration. Surveillance subsystem configuration alterations include changes in beam scanning geometry, transmitted waveform, digital radar processor (DRP) tuning, virtual intrusion zone design, and threat logic. Deterrent activation processor alterations include adjustments to mappings between intrusion zones and selection of responding deterrent apparatuses. Deterrent subsystem alterations include adjustments to the nature of the responses of the deterrent devices associated with each deterrent apparatus. For example, predator and distress calls could be varied, or cannon firing sequences could be altered.

Selection of a suitable alternate configuration parameter set is either done by an operator following analysis, or made automatically by an optional automated expert system such as a cognitive processor, inference engine, neural network, or rule-based processor.

It should be noted that in accordance with the present invention, the surveillance subsystem may include surveillance sensors that are airborne or space-based as well as land-based. As used herein, land-based includes being deployed or mounted on the earth (including dry ground and water surfaces), on vehicles or vessels, and on structures that may rise into the air but are tethered to or mounted on or in contact with the earth. The land-based surveillance sensors are preferably mounted on pole-tops, towers, or on one or more re-locatable trailers. A trailer could also house the indoor equipment and electronics associated with the surveillance subsystem, the deterrent activation processor, the deterrent subsystem, and the information subsystem.

In accordance with the present invention, sensor apparatuses are preferably avian radars and networks. Avian radars and networks are known to those skilled in the art, and are described in the following: *Could Avian Radar have Prevented US Airways Flight* 1549's *Bird Strike?*, Nohara, T J, 2009 Bird Strike North American Conference, Sep. 14-17, 2009, Victoria, B. C., *Reducing Bird Strikes—New Radar Networks can help make Skies Safer*, Nohara, T J, Journal of Air Traffic Control, Vol 51, No. 3, Summer 2009, pages 25 to 32, *Affordable Avian Radar Surveillance Systems for Natural Resource Management and BASH Applications*, Nohara, T J et al, 2005 IEEE International Radar Conference, May 9-12, 2005, Arlington, Va., and US, U.S. Pat. No. 7,940,206 entitled "Low-cost, high-performance radar networks", and U.S. Pat. No. 7,864,103 entitled "Device and method for 3D height finding radar", all of which are incorporated herein by reference.

The present invention preferably uses a pencil beam antenna such as a dish antenna with each avian radar sensor apparatus so that it can be inclined vertically to survey a particular band of altitudes while providing 360° coverage. Preferable dish antennas include ones that not only scan horizontally, but also scan in the vertical dimension under electronic or software control, providing preferably cylindrical coverage (e.g., 0 to 5 km range, 0 to 1000' altitude above ground level, 0 to 360°). Antennas that also scan in the vertical dimension allow improved target altitude estimates to be made and consequently improved radar cross section estimates as described in U.S. Pat. No. 7,864,103. The pencil beam antenna is preferably coupled to an X-band radar transceiver and a digital radar processor (DRP) that implements adaptive clutter-map processing, automated low-threshold detection and MHT/IMM tracking (multiple hypothesis testing/interacting multiple models) for small maneuvering bird targets, all as described in detail in the aforementioned references incorporated herein. The key advantage that results from this preferred embodiment over conventional systems using array antennas is that 3D bird trajectories containing {latitude, longitude, altitude, heading, speed, and radar cross-section (RCS)} updated every couple of seconds are available from the surveillance subsystem, completely characterizing bird movements and behavior in response to activation of deterrents, which is essential to measure habituation. Multipath suppression and sidelobe suppression are preferably included in accordance with the present invention to reduce false targets and hence habituation. In airport and mining operations, both of these artifacts are commonly experienced as the result of the presence of large buildings, vehicles, aircraft, and machines. Multipath suppression cancels false targets that appear at multiple ranges, whereas sidelobe suppression cancels false targets that appear at multiple azimuths. Multipath and sidelobe false targets, if not suppressed, can cause false threat alerts.

In addition, threat alerts can be inhibited if detected birds are not at altitudes that pose a threat; altitude selectivity will significantly reduce habituation. For example, by setting a maximum altitude threshold of say 500' AGL (above ground level), deterrents will not activate when birds are flying high through an area with tailings ponds or above a wind farm.

Finally, the use of adaptive clutter-map processing means that the surveillance subsystem will be able to see (track) birds over land and issue threat alerts as they approach a tailings pond while still a distance away. Early threat alerts support multiple lines of defense by staggering and activating outward-facing long-range deterrents such as high-pressure acoustic devices (e.g., HPADs or Hyperspike emitters), followed by short-range deterrents (such as cannons, effigies, lasers, etc.) if the birds make it through the outer defense layer and penetrate the protected area. This multi-layered approach is in contrast to conventional radar-activated deterrents which are not able to reliably see birds over land, and have been limited to a few inward facing deterrents directed over a tailings pond and hard-wired to the radar sensor near the ponds edge.

In accordance with the present invention, the surveillance sensor apparatuses can use any sensor capable of localizing birds in at least the horizontal ground plane. Therefore, 2D avian radars and/or camera (visible or infrared) or acoustic sensors with suitable processing can be used to provide surveillance coverage volume.

The flexible separation between the surveillance subsystem and the deterrent subsystem is an important and novel feature of the present invention. The interface between the two is provided by the deterrent activation processor, which is programmable and maps threat alerts to particular deterrent apparatus activations. With network interfaces between the deterrent activation processor and the surveillance, deterrent and information subsystems, these components can be located anywhere (in the world) where network connectivity is available. As a result, third-party sensors can also be used to supplement or provide surveillance coverage volume and generate threat alerts including national radar networks such as NEXRAD, airport surveillance radars, and weather radars. In addition, deterrents can be located anywhere; they need not be located close to the surveillance sensor apparatuses. This flexibility facilitates organizing lines of defense with deterrent apparatuses placed where they are most efficacious. In a preferred embodiment in accordance with the present invention, the deterrent subsystem communicates with its multitude of deterrent apparatuses using a radio mesh network, optionally in the 900 MHz band, so deterrent apparatuses can be located in virtually any arrangement, even where line of sight is not available. A GPS device is also preferably located on each deterrent apparatus with its location reported on a regular basis to the deterrent subsystem and from there to the information subsystem so that the system always knows where the deterrent apparatuses are located. This is particularly important for floating deterrents on tailings ponds that can drift or move due to ice build-up or melting.

In accordance with the present invention, the deterrent subsystem can include land-based and airborne deterrent apparatuses. Land-based includes direct ground deployments, trailer mountings, floating platform or barge mountings, vehicle or boat-mounted, and pole or tower mounting. Airborne deterrent apparatuses include deterrent devices mounted on manned as well as small un-manned aircraft such as remotely controlled (RC) aircraft. RC aircraft carrying lightweight deterrent payloads could be directed to intersect and harass birds, as could RC boats.

The deterrent subsystem is preferably powered by on-board power including generator, and solar or wind power to maintain re-locatability, which is required typically in tailings pond applications. Otherwise, shore-power can be used. The surveillance subsystem is preferably powered by on-board generator when re-locatability is needed, or shore-power otherwise.

A desirable surveillance subsystem option and related method option in accordance with the current invention combines the antenna coverage volumes of each respective surveillance sensor apparatus to form a composite coverage volume of the surveillance subsystem within which multiple virtual sub-volumes or intrusion zones are defined and within which the detected birds threatened or posing threats are localized. These virtual intrusion zones are very flexible in that they support multiple lines of defense for the protected area; i.e., each intrusion zone can be associated with or mapped to particular subsets of deterrents by the deterrent activation processor. For example, long range deterrent devices such as high-power acoustic devices (HPADs) can be located around a protected area such as a tailings pond, directed outwards and focused at birds located 1 km or more away from the pond, and activated by an intrusion zone located 1 to 2 km away only when birds are detected therein, approaching the pond, and at an altitude where landing on the pond is feasible.

The aforementioned, integrated, composite coverage volume with virtual intrusion zones is an especially important feature of the present invention for applications such as tailings ponds that require several, non co-located or mutually spaced surveillance sensors spanning a large geographic area to provide the required coverage for a single large protected area, or a very large protected area made up of multiple disjoint protected areas. In such cases, hundreds of deterrent apparatuses may be deployed, making it very difficult for operators to understand what is going on without integrated coverage and virtual, earth-coordinates-based intrusion zones. Preferably, the present invention employs avian radar networks (which are further described in the aforementioned references incorporated herein) to implement the composite coverage volume. The avian radar network is formed by each sensor's DRP integrating its tracks with a radar data server (RDS) that collates and serves the integrated data. A radar fusion engine (RFE) is optionally employed to fuse tracks from overlapping coverage areas (as further described in the aforementioned references incorporated herein). Each DRP converts all tracks to earth-coordinates before writing them to the RDS. This means that virtual intrusion zones can be easily defined directly in earth coordinates from the composite track data contained in the RDS. Each intrusion zone can be penetrated by birds seen (tracked) by any of the contributing avian radars.

Optionally, in accordance with the present invention, the system includes common operating picture (COP) software that runs on a computer in an operations centre as well as on mobile devices connected by data network to the information subsystem to give one or more operators complete situational awareness of real-time bird movements within the composite coverage volume provided by the surveillance subsystem, intrusion zone penetrations, protected area penetrations, deterrent apparatus activations, and bird responses to deterrents.

The various data networks connecting the surveillance, deterrent, and information subsystems, the deterrent activation processor, and the operation center computers and mobile devices running the COP software support various network protocols including TCP/IP and can be wired (e.g., CAT5/6, Ethernet, fibre) or wireless (e.g. WiFi, cellular, radio), in a local area network (LAN) configuration, wide-area network (WAN) configuration, public network such as the Internet, or hybrid network. The system design affords complete flexibility between locations and connections of system components.

The smart, automatic bird deterrent system network architecture in accordance with the present invention is also very useful for allowing independent operators from adjacent or nearby properties to share and integrate information. As transient or migrating birds fly from one property to another, operators can gain early warning of significant bird movements (as during migration) simply by allowing their respective COPs to receive selected information from their neighbor's information subsystem. If further integration is desired, they can even expand their composite coverage of their own surveillance subsystem by allowing a neighbor's DRP to write to their own RDS.

Accordingly, the present invention seeks to overcome the above-mentioned limitations associated with conventional automatic bird deterrent systems by providing and integrating new capabilities to reduce habituation, to provide wide-area protection over large and complex protected areas, and to provide protection at night. In particular, 3D surveillance sensor means are disclosed herein that can selectively respond, much like wildlife control personnel using hand-held deterrents, only to birds at altitudes and trajectories likely to penetrate and threaten or be threatened by protected areas, thereby reducing habituation. The radar apparatus and methods described in U.S. Pat. No. 7,864,103 entitled "Device and method for 3D height finding radar" incorporated herein by reference are applicable 3D sensor means, as well as other devices described herein. Furthermore, practical and economic means are disclosed herein that provide automatic, wide-area protection of large protected areas by integrating a multitude of non co-located radar sensors collectively used to define numerous virtual lines of defense associated with protected areas and deterrent devices. The radar networks apparatus and methods described in U.S. Pat. No. 7,940,206 entitled "Low-cost, high-performance radar networks" incorporated herein by reference are applicable wide-area, non co-located radar sensors means, in addition to those described herein. Finally, novel means are disclosed herein for measuring system effectiveness and avian habituation, thus allowing for system configuration to be adjusted and high performance to be maintained over time. We refer to these automated bird deterrent systems in accordance with the present invention as being smart in that they are selective, flexible, and adaptive, and can measure and respond to their environment in order to maintain effectiveness.

It will be obvious to those skilled in the art that the same improvements described herein are applicable to other non-bird targets, such as wildlife and humans, in order to protect areas in other applications including homeland security. Furthermore, the improvements can be achieved through the use of other sensors and devices. The focus on deterring birds in this disclosure is in no way intended to limit the scope and application for the invention disclosed herein to birds. Nor is the focus on radar intended to limit the scope and application to only using radar sensors.

These and other novel features of the present invention will become apparent in the sequel.

DETAILED DESCRIPTION

Figure 1:
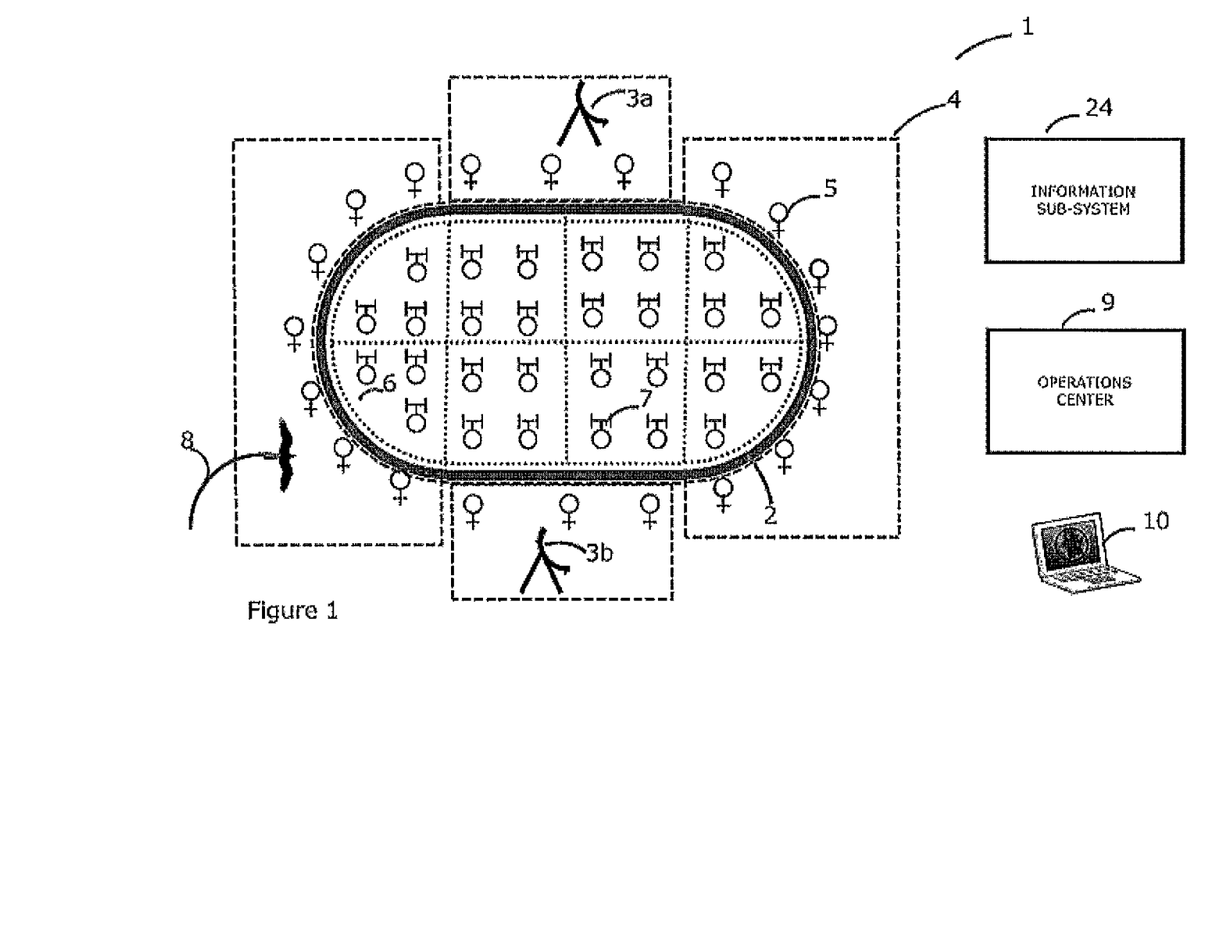
FIG. 1 is a deployment diagram of an automated bird deterrent system in accordance with the present invention.

A deployment diagram 1 of a typical, automated bird deterrent system 20 (see FIG. 2) in accordance with the present invention is shown in FIG. 1. A protected area 2 represents a region that threatens birds or is threatened by birds. For the example of FIG. 1, the protected area 2 is a large tailings pond. A surveillance subsystem 21 (see FIG. 2) monitors birds that may come into the protected area and consists of two sensor apparatuses 3a and 3b located in this example on either side of the protected area 2. The sensor apparatuses 3a and 3b are preferably avian radars as described previously herein which together provide coverage of birds in the vicinity of the protected area. Two virtual lines of defense are implemented in this example, an outer line of defense and an inner line of defense. The surveillance subsystem 21 defines in this case four outer intrusion zones 4 that surround the tailings pond that make up the outer line of defense. A number of deterrent apparatuses 5 are arranged in each intrusion zone along the water's edge facing outward towards incoming birds. The surveillance subsystem 21 continuously detects and tracks birds in the airspace using methods known to those skilled in the art and preferably those described herein. When birds 8 penetrate a particular outer intrusion zone 4, the surveillance subsystem 21 determines if they pose a threat and issues a threat alert to the deterrent subsystem 23 (see FIG. 2), which causes respective deterrent apparatuses 5 to activate. Outward facing deterrent apparatuses 5 are preferably high-pressure acoustic devices that can harass approaching birds while they are still a kilometer or more away from the pond. Eight inner intrusion zones 6 make up an inner line of defense in this example. The inner line of defense has deterrent apparatuses 7 organized on floating platforms on the surface of the pond to harass birds that make it through the outer line of defense and attempt to land on the tailings pond. Several inner deterrent apparatuses 7 are arranged in each inner intrusion zone 6 and activate when birds are detected there. A specially designed information subsystem 24 is the heart of the smart bird deterrent system 20 in accordance with the present invention. The information subsystem 24 stores the following: bird target trajectories as they approach an intrusion zone, intrusion zone penetrations and threat alerts, deterrent activations, and bird trajectory responses thereafter. This information provides real-time situational awareness to operators, and supports the calculation of measures of effectiveness and habituation so that system performance can be maintained. Operators monitor the bird deterrent system displays from within an operations centre 9 or on a remote mobile device or computer 10. Operators need not monitor system displays continuously and are alerted to bird intrusions. Alerts can include an audible alarm and display indication to an operator, or a transmitted message to a remote user. At the operations centre 9, operators can watch and interact with an integrated common operating picture (COP) display that presents in real-time the tracked birds in the area, and provides visual indications when intrusion zones are penetrated and when deterrents are activated. Operators can also monitor the effectiveness of the system, review measures of effectiveness and habituation computed by the system, and alter system configuration in response to degradation in performance and increases in habituation, as described herein.

The automatic bird deterrent system exemplified in FIG. 1 illustrates the various features of the present invention using a specific arrangement of sensor apparatuses, deterrent apparatuses, protected area, virtual lines of defense with specific intrusion zones, groupings of deterrent apparatuses, etc., without loss of generality. These arrangements are examples only, and in no way limit the variety of configurations and combinations that are in the spirit of the present invention. Any type of sensor apparatus and deterrent apparatus known to those skilled in the art apply herein. While most applications have the automatic bird deterrent system largely installed on land, that system could also be deployed in whole or in part on offshore platforms, or even on moving airports such as that provided by an aircraft carrier.

Preferably, embodiments of the automatic bird deterrent system 20 disclosed herein aim to take advantage of standardized COTS (commercial off-the-shelf) technologies to the maximum extent possible in order to keep the system cost low and to provide for low life cycle costs associated with maintainability, upgrade ability and training. Preferably, COTS marine radars are used as the radar sensor apparatus (3a and 3b) in order to minimize sensor costs. COTS personal computers (PC) are used preferably to carry out the various data processing tasks required by the bird deterrent system. The system preferably exploits COTS data communication technology to provide remote control of the sensor and deterrent apparatus, and to inexpensively distribute remote alerts and displays which contain rich system information to operators.

For bird deterrent applications involving large protected areas, one avian radar system, or even several independently operating avian radar systems are often not enough to provide a high-performance, composite picture covering the area of interest. For any single radar, there are gaps in coverage caused by obstructions, and the area covered may not be a large enough. One or more radar sensor apparatuses are preferably connected to a radar network to distribute their composite information to remote users as described earlier herein. Since the target data contain all of the important target information (date, time, latitude, longitude, altitude, speed heading, intensity, radar cross section (RCS), etc.), remote situational awareness is easily realized. Radar systems as disclosed herein may be networked to a central monitoring station (CMS) or operations centre 9. In addition to real-time display on a COP in the operations centre 9, various tools for target analytics are provided, as is the capability to replay past recorded target data, and preferably, to also replay intrusion zone and deterrent apparatuses responses.

Figure 2:
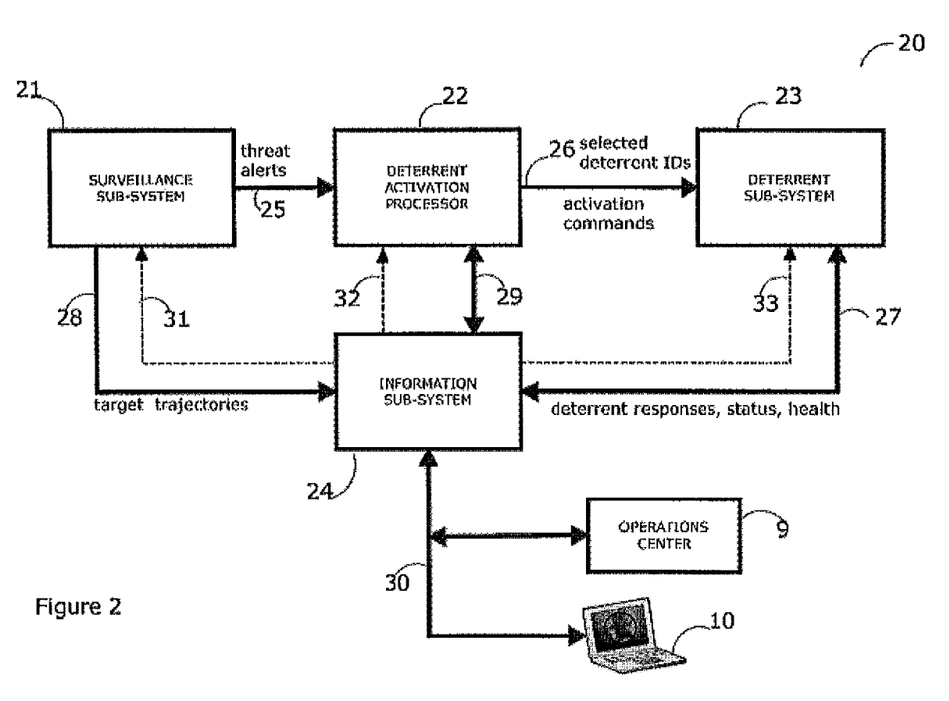
FIG. 2 is a system block diagram of a smart bird deterrent system in accordance with the present invention.

A block diagram of the automatic bird deterrent system 20 in accordance with the present invention is provided in FIG. 2. The surveillance subsystem 21 detects birds threatened by or posing a threat to a protected area (such birds are referred to simply in the sequel as the "threatened birds") and issues corresponding threat alerts 25 to a deterrent activation processor (DAP) 22, which controls a deterrent subsystem 23. Depending on where the threatened birds have been detected, the DAP selects appropriate deterrent apparatuses (or simply deterrents) 5, 7 and issues an activation command 26 to the deterrent subsystem 23 along with, preferably, the deterrents' respective IDs (identification numbers) 26, which the deterrent subsystem 23 uses to activate the selected deterrents 5,7. The selected deterrent identifications (IDs) and activation commands and times are stored in the information subsystem 24 over interface 29. Time formats known to those skilled in the art that uniquely capture date and time are used preferably in support of both wide-area integration described herein and long-term analysis over annual cycles. The deterrent subsystem 23 preferably acknowledges a deterrent response or activation by storing this feedback in the information subsystem 24 over interface 27. The surveillance subsystem 21, when detecting threatened birds, also stores the related bird tracks or associated trajectories in information subsystem 24 using interface 28. Each bird track or trajectory preferably contains latitude, longitude, altitude, speed, heading, RCS, and time data, updated preferably every couple of seconds to fully represent the 3D path or trajectory taken by the target. At a minimum, respective trajectories associated with a particular alert begin in time immediately prior to each issuance of the corresponding threat alert and continue well after the firing of respective selected deterrents, in order to allow either an operator, automated software, or target analytic tools to measure system effectiveness by examining the response of the threatened birds to the activated deterrents. Preferably, tracks for all birds are stored continuously and indefinitely in an information subsystem 24, including those tracks associated with particular threat alerts. Operators located in operations center 9 or using mobile or computing device 10 monitor and control the smart bird deterrent system 20 using common-operating-picture software or other software user-interfaces that connect to information subsystem 24 over network 30. The COP preferably interacts directly with information subsystem 24 and not only displays target tracks, threat alerts, and deterrent activations, but also provides a user-interface to control the various subsystems through interfaces 31, 32 and 33. Interface 31 provides configuration parameters to the surveillance subsystem 21 to alter its state so as to reduce habituation and maintain system performance. Similarly, configuration parameters associated with DAP 22 and deterrent subsystem 23 can be altered to reduce habituation and maintain performance. Operators can also check on the status of deterrents, including testing them, activating them or resetting them (for example when refueled or restarted due to a fault) using interface 27. Operators preferably can also access directly the surveillance subsystem 21, DAP 22 and deterrent subsystem 23 over standard network links 28, 29, and 27 respectively, for setup, initialization, and routine maintenance using standard tools and protocols such as virtual network computing (VNC) remote desktops.

Figure 3:
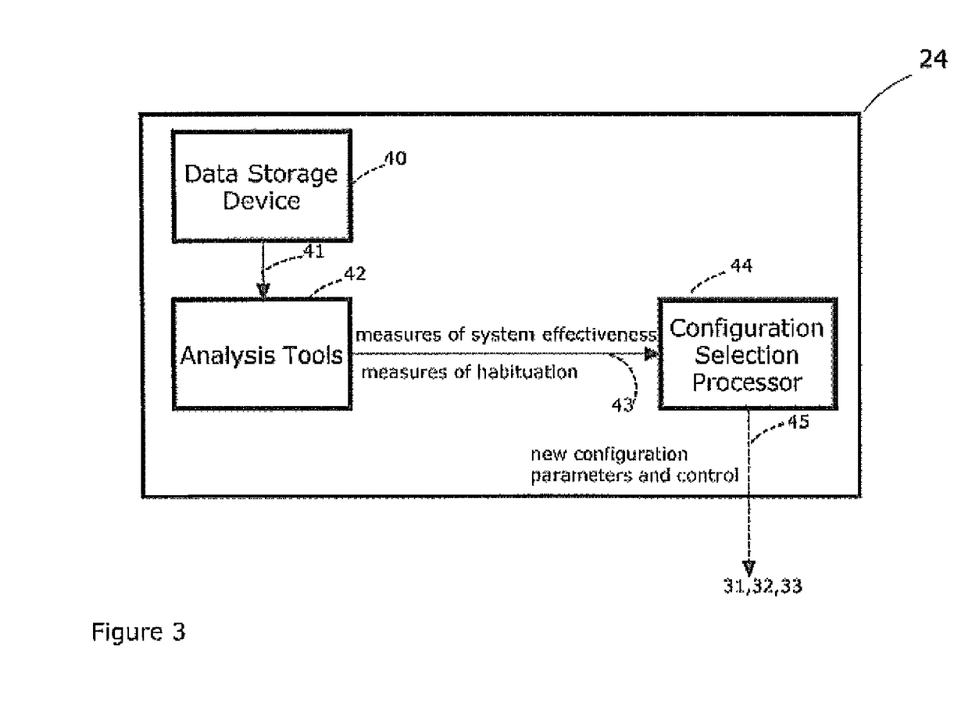
FIG. 3 is a block diagram of the information subsystem in accordance with the present invention.

A block diagram of a preferred embodiment of information subsystem 24 in accordance with the present invention is illustrated in FIG. 3. Data storage device 40 provides storage and access to the bird deterrent system information described herein, including bird tracks, threat alerts, and activated deterrent information, which is stored in real-time. Preferably, data storage device 40 is a SQL (structured query language) relational database management system, with schema and tables designed to facilitate use of the information by users and by analytical tools 42 that calculate measures of system effectiveness and measures of habituation 43 as shown in FIG. 3. These measures are used by configuration selection processor 44 to maintain system performance by determining when habituation has exceeded acceptable operating limits. In such a case, configuration selection processor 44 provides a set of new configuration parameters and control 45 to interfaces 31, 32, 33 that can be preferably loaded into the bird deterrent system 20 to reconfigure it so as to reduce habituation.

Data storage device 40 preferably organizes and stores continuously and indefinitely all narrowband target data, threat alert data, and deterrent subsystem activation data for periodic calculation of habituation measures, as well as other analytical calculations and statistics in support of safety management systems, risk management, due diligence, investigations, litigation, scientific analyses, training, and public policy. Such calculations and statistics are carried out using analytical tools 42, which are preferably implemented as software-configured generic digital processing circuits that can easily execute pertinent calculations exploiting the data contained in data storage device 40. Habituation and performance measures tabulate the number or percentage of birds deterred by the automatic bird deterrent system 20 over some period of time and/or space and thus allow the tracking of changes in such measures over time. The configuration selection processor 44 is provided preferably with a multitude of configuration parameter sets that reconfigure automatic bird deterrent system 20 by varying one or more parameters in surveillance subsystem 21, DAP 22, and/or deterrent subsystem 23. When a change in habituation is determined by configuration selection processor 44, it provides one of these new configuration parameter sets and causes, through control, the change in such parameters to those found in the new configuration parameter set. Preferably, configuration parameter sets are stored in files and the control required to reconfigure the automatic bird deterrent system 20 is simply the loading of a new configuration parameter file, causing respective surveillance subsystem 21, DAP 22, and deterrent subsystem 23 to change accordingly. A trained operator can use analytical tools 42 to measure habituation and configuration selection processor 44 to change the configuration of automatic bird deterrent system 20; or alternatively, analytical tools 42 and/or configuration selection processor 44 could be optionally replaced by an expert system, known to those skilled in the art, such as a cognitive processor, inference engine, neural network, or rule-based processor to automatically reconfigure bird deterrent system 20. In this case, control interfaces 31, 32, and 33 to surveillance subsystem 21, DAP 22, and deterrent subsystem 23, respectively, are preferably command interfaces controlled in software over a data network by the expert system to automatically change particular parameters on the fly, or to reload parameter sets to alter the state of respective surveillance subsystem 21, DAP 22, and deterrent subsystem 23.

Other sources of information about the environment, bird activity and deterrence effectiveness can be used in the aforementioned analysis and configuration selection processes such as weather, man-made clutter sources (e.g. vehicle and aircraft patterns), known diurnal and seasonal patterns of bird movement (incl. migration), human-observed presence or absence of birds in and around protected areas, and observed migration in other regions that might be heading toward protected areas. This information can also be used in establishing a general or background a priori threat assessment condition for a facility with a protected area, increasing general awareness of bird condition.

Figure 4:
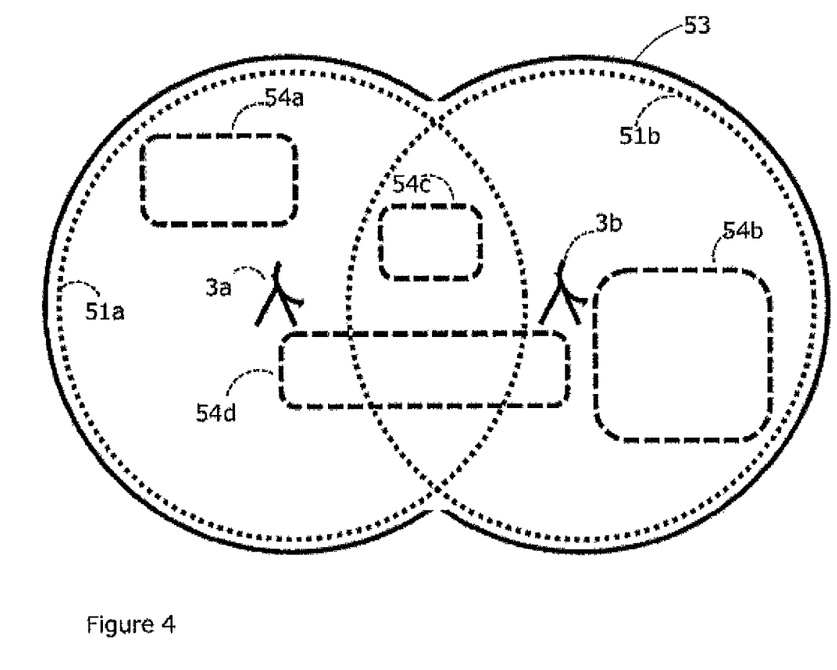
FIG. 4 is a diagram of the composite coverage volume with multiple intrusion zones in accordance with the present invention.

In accordance with a feature of the present invention, flexible and affordable, integrated, wide-area coverage is provided through the use of multiple surveillance sensors as illustrated in FIG. 4. When a large protected area cannot be sufficiently covered by sensor apparatuses at a single location, a multitude of non co-located or mutually spaced sensor apparatuses are used to provide the required composite coverage. For example, consider the two sensor apparatuses 3a and 3b shown in FIG. 4, which are preferably avian radars as described previously. Coverage volume 51a and coverage volume 51b denote, respectively, the antenna coverage volumes of avian radars 3a and 3b. The combined composite coverage volume 53 is the union of the individual coverage volumes and, hence, in the example shown in FIG. 4, almost doubles the surveillance coverage volume of each sensor apparatus. In accordance with the present invention, one or more intrusion zones or sub-volumes 54 are defined within the composite coverage volume to implement virtual lines of defense against birds threatening or threatened by one or more protected areas. Typically, the protected area(s) are contained within the composite coverage volume 53 but need not be so. Arbitrarily shaped and located intrusion zones can be defined within composite coverage volume 53. For example, intrusion zone 54a is contained within antenna coverage volume 51a and has no part contained in antenna coverage volume 51b. On the other hand, intrusion zone 54b is contained completely within antenna coverage volume 51b and has no part contained in antenna coverage volume 51a. Intrusion zone 54c is completely contained within the overlapping region of antenna coverage volumes 51a and 51b. Finally, intrusion zone 54d has a portion of its volume only within 51a, another portion only within 51b, and the remainder within the overlapping region.

Especially in the overlapped regions of a composite coverage volume, the same bird will likely be tracked by more than one sensor apparatus. As a result, the present invention preferably resolves duplicate bird tracks so as to avoid multiple threat alerts being issued in response to the same bird entering an intrusion zone. This can be achieved using a number of different approaches. For example, bird tracks for the same bird generated by multiple sensors can be fused into a single track before testing intrusion zones for birds threatening or threatened by a protected area. Alternatively, two threat alerts could be generated, one for each contributing track, but the second threat alert could be inhibited if it is associated with the same intrusion zone, occurs near-simultaneously, and if the trajectory would result in the same deterrent apparatuses being activated.

Figure 5:
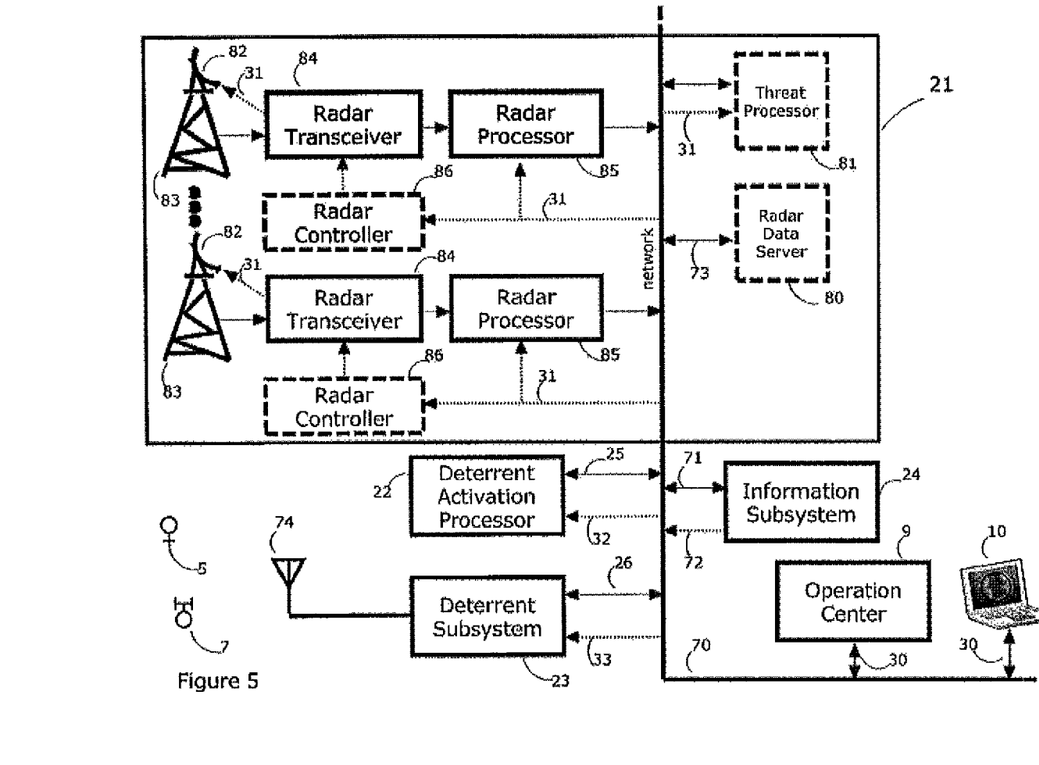
FIG. 5 is a block diagram of a preferred embodiment of the automatic bird deterrent system in accordance with the present invention.

A preferred embodiment of the present invention that is well suited for very large protected areas is shown in FIG. 5. A surveillance subsystem 21 consists of a multitude of avian radars at different locations that are preferably used to form an avian radar network as described in U.S. Pat. No. 7,940,206. Preferably, dish antennas with pencil beams are used so that latitude, longitude, and altitude localization of bird targets is provided. Other antennas such as those described in U.S. Pat. No. 7,864,103 can also be used. These include dual-axis scanning dish antennas that rotate horizontally 360° on one axis and can scan vertically as well on a second axis. A multitude of radar platforms (typically towers, pole tops, or trailers) 83, each including an avian radar antenna 82, are preferably used as sensor apparatuses placed strategically throughout the combined coverage volume 53. Each antenna 82 couples with radar transceiver 84. Preferably, radar transceiver 84 is an X-band (or S-band) transceiver. Each transceiver 84 is connected to a digital radar processor 85 (DRP) that digitizes the received radar signals and carries out detection and track processing, as described earlier herein. Target data (which includes tracks and preferably includes detections as well) is stored locally in DRP 85 but is also sent continuously in real-time over network 70 to an optional but preferable radar data server 80 through network connection 73 for permanent storage and distribution (access) to other system elements. An optional and preferable threat processor 81 accesses real-time target tracks from radar data server 80 over a network connection, determines whether intrusion zones are penetrated by corresponding birds and whether such birds are threatened by or are a threat to a protected area, and issues threat alerts 25 accordingly to deterrent activation processor 22. Target data and threat alerts are also sent to information subsystem 24 in real-time as previously described herein, over network interface 71. The surveillance subsystem 21 also preferably includes optional radar controllers 86 (typically one for each radar transceiver) that provide operator control or automatic control 31 of radar transceiver 84 and antenna 82. In addition, software control 31 of radar processor 85 is preferably provided to change the radar processor configuration. The aforementioned controls 31 facilitate configuration parameter changes in response to configuration selection processor 44 of information subsystem 24. Information subsystem 24 also facilitates configuration parameter changes for deterrent activation processor 22 over interface 32 and for deterrent subsystem 23 over interface 33, all of which are connected to network 70.

Deterrent activation processor 22 receives threat alerts from surveillance subsystem 21 (directly from threat processor 81 if it is provided) from which it determines and selects the specific deterrents to be activated, communicating this information to deterrent subsystem 23 over network interface 26, while providing the same data to information subsystem 24 over network interface 71. Deterrent subsystem 23 preferably uses radio 74 to communicate with deterrent apparatuses 5 and 7 causing the selected deterrent(s) to activate in response to each threat alert. Preferably, radio 74 supports a mesh network with deterrent apparatuses 5 and 7. Note: there can be hundreds of these in practice to protect large protected areas; the two shown here are simply illustrative, indicating that multiple deterrent devices are typically deployed and of different varieties and serving different lines of defense as described earlier. Alternative forms of technology to radio (e.g. wired, including coax, cat6, twisted pair) can provide the communication between 23 and 5, 7. Preferably, deterrent subsystem 23 confirms when the selected deterrent(s) have activated, providing feedback over network interface 26 to information subsystem 24 connected to network 70 through network interface 71. Furthermore, deterrent subsystem 23 preferably polls the status of deterrent apparatuses 5, 7 and provides such data to information subsystem 24 so that it can maintain system operational-status information.

One or more operations centers 9 as well as mobile or remote user displays 10 can connect to network 70 from virtually anywhere to receive real-time bird deterrent information via common operating picture software as described earlier. Users have complete control of the automatic bird deterrent system through user interfaces implemented in software that control the various system elements over the various control interfaces described herein, and referenced to FIG. 5. Each system element (e.g., radar processor 85, radar controller 86, threat processor 81, radar data server 80, deterrent activation processor 22, deterrent subsystem 23, information subsystem 24, operations center 9, and mobile/remote user display 10) can be connected to network 70 via any standard network connection including wired or wireless, LAN, WAN, Internet, Intranet, Wi-Fi, 3g, 4g, point-to-point, SATCOM, etc. This means that in accordance with the present invention, system elements can be located virtually anywhere, providing the flexibility needed for complex deployments and information sharing arrangements and integration.

Particular features of our invention have been described herein. However, simple variations and extensions known to those skilled in the art are certainly within the scope and spirit of the present invention. This includes variations on integration of the functional blocks described herein.

What is claimed is:

1. A real-time, automated, bird deterrent system comprising: a) a surveillance subsystem including at least one surveillance sensor apparatus adapted for detecting birds and issuing a threat alert when detected birds pose a threat to or are subject to a threat from a protected area; b) a deterrent subsystem including at least one deterrent apparatus adapted for harassing detected birds in response to said threat; c) a deterrent activation processor, operatively connected to said surveillance subsystem, that receives said threat alert from said surveillance subsystem, said deterrent activation processor being operatively connected to said deterrent subsystem for selecting and activating a subset of deterrent apparatuses of said deterrent subsystem in response to said threat alert; and d) an information subsystem operatively connected to said surveillance subsystem and said deterrent activation processor for collecting information on bird trajectories or tracks, threat alerts, and deterrent activations and based on the collected information executing at least one activity taken from the group consisting of (i) measuring system effectiveness and avian habituation; (ii) altering system configuration to reduce habituation; (iii) interfacing with system operators; and (iv) calculating a set of data analytics.

2. The system in claim 1 wherein said information subsystem comprises a data storage device that stores the identification, date and time associated with each threat alert, the identification of the respective deterrent apparatuses that were activated in response to said threat alert, the respective trajectories of said detected birds provided by said surveillance subsystem, and said trajectories beginning no later than the time of said threat alert and continuing a sufficient time after the activation of said respective deterrent apparatuses to enable determination of whether said detected birds left said protected area in response to said activation of said respective deterrent apparatuses.

3. The system in claim 1 wherein said at least one surveillance sensor apparatus includes two or more sensor apparatuses, the antenna coverage volumes of said respective surveillance sensors combining to form a composite coverage volume of said surveillance subsystem within which multiple virtual sub-volumes or intrusion zones are defined and within which said detected birds are localized, and where said threat alert is generated by said surveillance subsystem when birds that pose a threat to or are threatened by said protected area are detected in an intrusion zone.

4. The system in claim 2 wherein said information subsystem further comprises tools for analyzing the information stored in said data storage device to determine the behavior of said detected birds in response to activation of said deterrent apparatuses, thereby providing a measure of system effectiveness and a measure of avian habituation.

5. The system in claim 4, further comprising means for altering the configuration of the bird deterrent system in response to a degradation in said measure of system effectiveness or an increase in said measure of avian habituation.

6. The system in claim 5 wherein said means for altering of said configuration includes a software-implemented control.

7. The system in claim 4 wherein said tools are taken from the group consisting of automated expert systems, cognition engines, inference engines, neural networks and rule-based processors.

8. The system in claim 4 wherein said measures of system effectiveness include at least one taken from the group consisting of total number of bird intrusions successfully deterred per hour, day, week, month, season, or year, and percentage of bird intrusions successfully deterred per hour, day, week, month, season, or year.

9. The system in claim 1 wherein said surveillance sensor apparatus is taken from the group consisting of 3D avian radars, 2D avian radars, infrared sensors, camera sensors, airport surveillance radars, weather radars, and national radar networks such as NEXRAD.

10. The system in claim 3 wherein said surveillance subsystem is configured to: i. track birds in said composite coverage volume to provide said respective trajectories for each tracked bird or flock; ii. determine whether there are any tracks penetrating any of said intrusion zones; and iii. further determine from the trajectory for each such penetrating track that its associated bird or birds are already in or on a course towards an associated protected area.

11. The system in claim 10 where said trajectories are 3D trajectories defined by latitude, longitude, altitude, speed, and heading versus time.

12. The system in claim 11 wherein said surveillance subsystem is further configured to determine whether the altitude of said associated birds is within programmed altitude limits so as to be considered a threat with respect to said associated protected area, whereby unnecessary activation of deterrents may be avoided.

13. The system in claim 1 wherein the deterrent apparatuses are connected to one or more other components of the bird deterrent system through a wireless network.

14. The system in claim 13 where each of said deterrent apparatuses is movable independently of others of said deterrent apparatuses and includes a GPS device that communicates on a regular basis with at least one other component of the bird deterrent system over said wireless network to update a recorded position of the respective deterrent apparatus.

15. The system in claim 1 wherein said deterrent apparatuses are taken from the group consisting of portable and fixed land-based deterrent apparatuses, deterrent apparatuses on floating platforms for use on ponds, and deterrent apparatuses on airborne platforms, each deterrent apparatus comprising one or more deterrent devices taken from the group consisting of effigies, fixed and moving lasers, cannons, and short and long-range acoustic devices with aversive auditory emissions including predator and avian distress calls.

16. The system in claim 15 wherein the deterrent subsystem includes at least tens of deterrent apparatuses distributed over said protected area, said protected area being divided into zones wherein groups of deterrent apparatuses are activatable together in response to threat alerts.

17. The system in claim 3 further comprising an operations center with common operating picture software that displays to operators in an earth-coordinates presentation real-time bird trajectories from said composite coverage volume, intrusion zones that appear differently when triggered, and the deterrent apparatuses represented by symbols at respective locations and appearing differently when activated.

18. The system in claim 17 which said common operating picture software is configured to integrate system operational-status information and provide a system operator with full situational awareness.

19. The system in claim 18 wherein the surveillance subsystem, deterrent activation processor, deterrent subsystem, information subsystem and operations center are all connected to each other via one or more wired or wireless data networks taken from the group consisting of local area networks, wide-area networks, public networks, the Internet, cellular networks, satellite networks, and mesh radio networks.

20. The system in claim 19, further comprising one or more remote computers or mobile devices operatively connected at least to the information subsystem via the one or more wired or wireless data networks, said remote computers or mobile devices being provided with respective common operating picture software.

21. The system in claim 5 where each said sensor apparatus associated with said surveillance subsystem is an avian radar and includes a digital radar processor for computing said bird trajectories where said trajectories are target tracks, further comprising a radar data server operatively connected to said digital radar processor for organizing and storing said target tracks in real-time and providing access of the organized and stored target tracks to operators for display of real-time tracks, as well as access to historical tracks by operators and by said information subsystem, said avian radar further including a radar controller configured to alter the state of the avian radar, said surveillance subsystem further including a threat processor for computing in real-time threat alerts, and sending said threat alerts to said deterrent activation processor and said information subsystem.

22. The system in claim 1 where said sensor apparatus is an avian radar with a pencil beam antenna that provides bird target localization in latitude, longitude, and altitude.

23. The system in claim 1 where said surveillance subsystem includes multipath suppression and sidelobe suppression processing to reduce false targets and hence habituation.

24. The system in claim 1 wherein said at least one surveillance sensor apparatus is taken from the set of fixed land-based sensor apparatuses, sensor apparatuses on floating platforms, moving vehicles or vessels, and sensor apparatuses on airborne platforms.

25. A real-time, automated, integrated bird deterrent system comprising: i. a surveillance subsystem including at least two surveillance sensor apparatuses adapted for detecting birds posing a threat to or subject to a threat from a protected area, the antenna coverage volumes of said surveillance sensor apparatuses combining to form a composite coverage volume, said surveillance subsystem being configured to define multiple virtual sub-volumes or intrusion zones in said composite coverage volume within which the detected birds are localized; ii. a deterrent subsystem including at least two deterrent apparatuses adapted for harassing said detected birds in response to said threat, said deterrent apparatuses being so spaced from one another as to require respective supports, mounts or platforms; and iii. a deterrent activation processor operatively connected to said surveillance subsystem for receiving a threat alert therefrom when birds that pose a threat to or are subject to a threat from said protected area are detected in one or more of said virtual sub-volumes or intrusion zones, said deterrent activation processor being configured to select any one of a plurality of subsets of said deterrent apparatuses to activate, said deterrent activation processor being operatively connected to each of said deterrent apparatuses separately for activating the selected subset of deterrent apparatuses in response to said threat alert from said surveillance subsystem.

26. The system in claim 25 also comprising an information subsystem operatively connected to at least said surveillance subsystem and said deterrent activation processor for collecting information on bird trajectories or tracks, threat alerts, and deterrent activations.

27. The system in claim 26 wherein said information subsystem is operatively connected to at least said surveillance subsystem and said deterrent activation processor for collecting sufficient information on bird trajectories or tracks, threat alerts, and deterrent activations in order to enable at least one activity taken from the group consisting of (i) measuring system effectiveness and avian habituation; (ii) altering system configuration to reduce habituation; (iii) interfacing with system operators; and (iv) supporting a variety of data analytics.

28. The system in claim 27 wherein said information subsystem comprises a data storage device that stores the identification, date, and time associated with each said threat alert, the identification of the said respective deterrent apparatuses that were activated in response to said threat alert, and the respective trajectories of said detected birds provided by said surveillance subsystem, said trajectories beginning no later than the time of said threat alert and continuing a sufficient time after the activation of said respective deterrent apparatuses to enable determination of whether the detected birds left the protected area in response to activation of said respective deterrent apparatuses.

29. The system in claim 25 where each said sensor apparatus associated with said surveillance subsystem is an avian radar and includes a digital radar processor for computing said bird trajectories where said trajectories are target tracks, further comprising a radar data server operatively connected to said digital radar processor for organizing and storing said target tracks in real-time and providing access of said target tracks to operators for display of real-time tracks, as well as access to historical tracks by operators and by said information subsystem, said avian radar further including a radar controller configured to alter the state of the avian radar; said surveillance subsystem further including a threat processor for computing in real-time threat alerts and sending said threat alerts to said deterrent activation processor and said information subsystem.

30. The system in claim 25 where said sensor apparatus is an avian radar with a pencil beam antenna that provides bird target localization in latitude, longitude, and altitude.

31. The system in claim 25 where said surveillance subsystem includes multipath suppression and sidelobe suppression processing to reduce false targets and hence habituation.

32. A real-time, automated, bird deterrent method comprising: operating a surveillance subsystem with at least one surveillance sensor apparatus to substantially continuously monitor a surveillance region to detect birds posing a threat to or subject to a threat from a protected area, the operating of said surveillance subsystem including generating and transmitting a threat alert when said birds posing a threat to or subject to a threat from a protected area are detected, the operating of said surveillance subsystem further including tracking detected birds or flocks and generating trajectories for each of the tracked birds or flocks; operating a deterrent activation processor to receive threat alerts from said surveillance subsystem, to select at least one deterrent apparatus of a deterrent subsystem in response to each of said threat alerts, and to issue an activation signal for activating said at least one deterrent apparatus; operating said deterrent subsystem to receive said activation signal from said deterrent activation processor and activate said at least one deterrent apparatus in response to said threat alerts generated by said surveillance subsystem; operating an information subsystem to collect information from said surveillance subsystem and said deterrent activation processor on bird trajectories or tracks, threat alerts, and deterrent activations; and executing, based on the collected information, at least one activity taken from the group consisting of (i) measuring system effectiveness and avian habituation; (ii) altering system configuration to reduce habituation; (iii) interfacing with system operators; and (iv) calculating a set of data analytics.

33. The method in claim 32 wherein the operating of said information subsystem includes storing bird deterrent system information including the identification, date, and time associated with each threat alert, the identification of respective deterrent apparatuses activated in response to said threat alert, the respective trajectories of said detected birds provided by said surveillance subsystem, and said stored trajectories beginning no later than the respective time of said threat alert and continuing a sufficient time after the activation of said respective deterrent apparatuses to enable determination of whether said detected birds left said protected area in response to activation of said respective deterrent apparatuses.

34. The method in claim 33 wherein said operating of said information subsystem further includes (a) analyzing said bird deterrent system information to determine the behavior of said detected birds in response to activation of said respective deterrent apparatuses and (b) computing, from the determined behavior, at least one measure taken from the group consisting of (i) system effectiveness; and (ii) avian habituation.

35. The method in claim 32 wherein said operating of said surveillance subsystem, said deterrent activation processor, and said deterrent subsystem further includes altering the configuration of one or more of said surveillance subsystem, deterrent activation processor, and deterrent subsystem in response to determining that a degradation in said measure of system effectiveness or an increase in said measure of avian habituation has occurred.

36. The method in claim 35 wherein said altering of said configuration is carried out by software control.

37. The method in claim 34 wherein said analyzing of said bird deterrent system information is carried out using one or more methods taken from the group consisting of automated expert systems processing, cognitive processing, inference processing, neural network processing, and rule-based processing.

38. The method in claim 34 wherein said computing of measures further includes computing at least one measure taken from the group consisting of total number of bird intrusions successfully deterred per hour, day, week, month, season, or year, and percentage of bird intrusions successfully deterred per hour, day, week, month, season, or year.

39. The method in claim 32 wherein said operating of said surveillance subsystem includes the operating of sensor apparatuses taken from the group consisting of 3D avian radars, 2D avian radars, infrared sensors, camera sensors, airport surveillance radars, weather radars, and national radar networks such as NEXRAD.

40. The method in claim 32 wherein the operating of said surveillance subsystem further includes operating two or more sensor apparatuses and forming a composite coverage volume of said surveillance subsystem from respective antenna coverage volumes of said two or more sensor apparatuses, within said composite coverage volume multiple virtual sub-volumes or intrusion zones being defined within which said detected birds are localized, wherein said generating of said threat alert occurs when birds that pose a threat to or are threatened by said protected area are detected in any of said intrusion zones.

41. The method in claim 40 wherein the generating of each said threat alert includes: i. tracking birds in said composite coverage volume and providing respective trajectories for each tracked bird or flock; ii. determining whether any of said trajectories penetrate any of said intrusion zones; and iii. further determining from the trajectory or track for each such penetrating track that its associated bird(s) are in or on a course towards said protected area.

42. The method in claim 41 where the providing of said trajectories including computing 3D trajectories defined by latitude, longitude, altitude, speed, and heading versus time.

43. The method in claim 41 wherein said determining of said course towards said protected area includes determining that the altitude of the associated birds is within programmed altitude limits to be considered a threat with respect to said protected area, whereby unnecessary activation of deterrents may be avoided.

44. The method in claim 32 wherein said operating of the deterrent activation processor to activate said at least one deterrent apparatus includes sending an activation command to said at least one selected deterrent apparatus over a wireless network.

45. The method in claim 44 where the operating of said deterrent subsystem further includes operating each deterrent apparatus to transmit its GPS coordinates to said deterrent activation processor over said wireless network to update the reported position of such deterrent apparatus.

46. The method in claim 32 wherein said operating of said deterrent subsystem further includes activating multiple deterrent devices affixed to said at least one deterrent apparatus in response to said threat alert, said devices being taken from the group consisting of effigies, cannons, fixed and moving lasers, and short and long-range acoustic devices with aversive auditory emissions including predator vocalizations and avian distress calls.

47. The method in claim 32 wherein said operating of said deterrent subsystem includes deploying at least tens of deterrent apparatuses distributed over said protected area, and selectively activating said deterrent apparatuses in groups to cover respective zones of said protected area.

48. The method in claim 40 wherein said bird deterrent method further comprises operating a user interface to present a common operating picture on a display, said operating of said user interface including generating an earth-coordinates presentation showing said bird trajectories from said composite coverage volume in real time, showing said intrusion zones in graphical form and altering the graphical form of a given intrusion zone when a threat alert is generated for that given intrusion zone, showing symbols indicative of multiple deterrent apparatuses at respective geographical locations, and altering the appearance of a given symbol when an associated deterrent apparatus is activated.

49. The method in claim 48 wherein the operating of said user interface to present said common operating picture further includes providing operating status information so that an operator can observe and determine the status of the surveillance subsystem, deterrent activation processor, deterrent subsystem, and information subsystem; and further includes providing operator controls to allow an operator to interact with the subsystems and said processor.

50. The method in claim 49 where the operating of the surveillance subsystem, deterrent activation processor, deterrent subsystem, information subsystem, and user interface includes sending data over wired and wireless data networks including local area networks, wide-area networks, public networks such as the Internet, cellular networks, satellite networks, and mesh radio networks.

51. The method in claim 50 wherein said operating of said user interface includes enabling access by operators at remote locations via personal computers and mobile devices connected to the Internet or wireless networks.

52. The method in claim 48 wherein said operating of said user interface includes presenting on said display real-time information on bird movements throughout the composite coverage volume, on the detection of birds penetrating particular intrusion zones, on resulting activations of selected deterrent apparatuses, and on behaviors of said birds in response to activations of said selected deterrent apparatuses, thereby allowing an operator to monitor system effectiveness and avian habituation.

53. The method in claim 32 where said protected area is made up of multiple, disjointed protected areas.

54. A real-time, automated, bird deterrent system comprising: a deterrent subsystem including at least one deterrent apparatus adapted for harassing detected birds in response to a threat alert; and a deterrent activation processor, configured to receive threat alerts from a surveillance system, said deterrent activation processor being operatively connected to said deterrent subsystem for selecting and activating a subset of deterrent apparatuses of said deterrent subsystem in response to said threat alert, said deterrent activation processor being configured to alter a deterrent apparatus activation protocol in response to an indication of avian habituation received from an information system.

55. The system in claim 54, further comprising said surveillance system as a subsystem, the surveillance subsystem including at least one surveillance sensor apparatus adapted for detecting birds and issuing said threat alerts when detected birds pose a threat to or are subject to a threat from a protected area.

56. The system in claim 55, further comprising said information system as a subsystem operatively connected to said surveillance subsystem and said deterrent activation processor for collecting sufficient information on bird trajectories or tracks, threat alerts, and deterrent activations, said information system being configured to measure avian habituation and produce said indication of avian habituation.

57. The system in claim 55 wherein said information system is further configured to enable at least one activity taken from the group consisting of (i) measuring system effectiveness; (ii) measuring avian habituation; (iii) interfacing with system operators; and (iv) supporting a variety of data analytics.

58. A real-time, automated, bird deterrent method comprising: operating a deterrent activation processor to receive threat alerts from a surveillance system, to select at least one deterrent apparatus of a deterrent subsystem in response to each of said threat alerts, and to issue an activation signal for activating said at least one deterrent apparatus; operating said deterrent subsystem to receive said activation signal from said deterrent activation processor and activate said at least one deterrent apparatus in response to said activation signal and in accordance with programmed operational parameters or configuration; and further operating at least said deterrent subsystem to change the operational parameters or configuration in response to a measurement of system effectiveness and avian habituation.

59. The method in claim 58 wherein said surveillance system includes at least one surveillance sensor apparatus, further comprising operating said surveillance system to substantially continuously monitor a surveillance region to detect birds posing a threat to or subject to a threat from a protected area, the operating of said surveillance system including generating and transmitting said threat alerts when said birds posing a threat to or subject to a threat from a protected area are detected, the operating of said surveillance system further including tracking detected birds or flocks and generating trajectories for each of the tracked birds or flock.

60. The method in claim 59, further comprising operating said surveillance system to alter operational parameters or configuration in response to an indication or signal generated upon measurement of a decrease in system effectiveness or increase in avian habituation.

61. The method in claim 59, further comprising collecting information from said surveillance system and said deterrent activation processor on bird trajectories or tracks, threat alerts, and deterrent activations.

62. The method in claim 58 wherein said deterrent subsystem includes a plurality of deterrent apparatuses, the operating of said deterrent activation processor including selecting a subset of said deterrent apparatus in accordance with a received threat alert.

* * * * *